(12) United States Patent
Wankawala et al.

(10) Patent No.: US 9,292,405 B2
(45) Date of Patent: Mar. 22, 2016

(54) HANA BASED MULTIPLE SCENARIO SIMULATION ENABLING AUTOMATED DECISION MAKING FOR COMPLEX BUSINESS PROCESSES

(71) Applicants: Pranav Wankawala, Palo Alto, CA (US); Irene Chen, Walldorf (DE); Vimala K, Walldorf (DE)

(72) Inventors: Pranav Wankawala, Palo Alto, CA (US); Irene Chen, Walldorf (DE); Vimala K, Walldorf (DE)

(73) Assignee: SAP SE, Walldorf (DE)

( * ) Notice: Subject to any disclaimer, the term of this patent is extended or adjusted under 35 U.S.C. 154(b) by 446 days.

(21) Appl. No.: 13/791,684

(22) Filed: Mar. 8, 2013

(65) Prior Publication Data

US 2014/0257785 A1 Sep. 11, 2014

(51) Int. Cl.
*G06F 11/34* (2006.01)
*G06F 11/00* (2006.01)

(52) U.S. Cl.
CPC .................................. *G06F 11/3457* (2013.01)

(58) Field of Classification Search
USPC ..................................... 703/2, 22; 706/13, 25
See application file for complete search history.

(56) References Cited

U.S. PATENT DOCUMENTS

| | | | |
|---|---|---|---|
| 6,502,102 B1 | 12/2002 | Haswell et al. | |
| 6,622,137 B1 | 9/2003 | Ravid et al. | |
| 6,735,596 B2 | 5/2004 | Corynen | |
| 7,437,614 B2 | 10/2008 | Haswell et al. | |
| 7,444,358 B2 | 10/2008 | Paczkowski et al. | |
| 7,835,893 B2 | 11/2010 | Cullick et al. | |
| 8,086,726 B2 | 12/2011 | Hofmann | |
| 8,250,169 B2 | 8/2012 | Beringer et al. | |
| 2002/0010572 A1 | 1/2002 | Orton et al. | |
| 2003/0149571 A1 | 8/2003 | Francesco et al. | |
| 2005/0262108 A1 | 11/2005 | Gupta | |
| 2008/0134152 A1 | 6/2008 | Edde et al. | |
| 2012/0096438 A1 | 4/2012 | Rossi et al. | |
| 2012/0311154 A1 | 12/2012 | Morgan | |
| 2013/0086473 A1 | 4/2013 | Faust et al. | |
| 2013/0254144 A1* | 9/2013 | Heidasch ............... | G06N 3/084 706/13 |
| 2014/0297574 A1* | 10/2014 | Heidasch ............. | G06N 3/0427 706/25 |
| 2015/0074036 A1* | 3/2015 | Lenz ..................... | G06N 5/043 706/52 |

* cited by examiner

*Primary Examiner* — Thai Phan
(74) *Attorney, Agent, or Firm* — Schwegman Lundberg & Woessner, P.A.

(57) ABSTRACT

Data for simulation are selected from an in-memory database of an in-memory database server or simultaneous scenarios simulation at a business application server. The simulation results of a plurality of scenarios received from the business application server are temporarily stored at the in-memory database. One scenario from the plurality of scenarios is selected based on using user-defined rules at the in-memory database server. The selected scenario is communicated to the business application server.

20 Claims, 5 Drawing Sheets

HANA BASED MULTIPLE SCENARIO SIMULATION ENABLING AUTOMATED DECISION MAKING FOR COMPLEX BUSINESS PROCESSES

FIELD

The present disclosure relates generally to database access, and in a specific example embodiment, to enabling multiple scenario simulation for complex business processes.

BACKGROUND

Legacy code in enterprise applications can run for long hours or sometimes for days. Because these programs can run for a long time, it is not possible to run multiple scenarios to compare results and pick the best one. One solution may be to run simulations using background mode that require an overnight job. To further exacerbate the problem, in some cases, the data or status may have already been changed while the analysis or calculation is still not finished, which may bring inaccuracy and ineffectiveness.

Another solution may be to let the simulation job run for several hours to eventually find out that the result may not be a satisfying one and further adjustment may be needed. However, since the result has already been saved by the enterprise application, changes to the simulation cannot be made. The only way is to backtrack and perform an operation, such as a de-allocation, that could restore the system and data but cannot restore the time that has already been spent.

Not all enterprise applications have simulation mode. But even if simulation mode is supported, users may need to run the process again to save the results. Users may not often use this functionality, because with simulation mode, the results will not be saved no matter whether the results are negative or positive. In this case, in order to save a job result and apply it to the enterprise application, users need to run the same process twice.

Another drawback of using enterprise applications to run simultaneous simulations it that it is nearly impossible to compare two different results at the same time. For instance, even if a simulation job does not consume too much time, users may wish to run two or more different scenarios at the same time. However, it is not possible to collect the results of different scenarios into one screen for comparison using the enterprise application. As such, it is inconvenient for users to decide which scenario is best or which scenario best fits an enterprise's strategy.

BRIEF DESCRIPTION OF DRAWINGS

The appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments, it will be evident, however, to those skilled in the art that embodiments of the inventive subject matter may be practiced without these specific details. In general, well-known instruction instances, protocols, structures, and techniques have not been shown in detail.

Examples of a system and method for enabling multiple scenario simulation for complex business processes are described. In one example embodiment, data for simulation are selected from an in-memory database of an in-memory database server for simultaneous scenarios simulation at a business application server. The simulation results of a plurality of scenarios received from the business application server are temporarily stored at the in-memory database. One scenario from the plurality of scenarios is selected based on using user-defined rules at the in-memory database server. The selected scenario is communicated to the business application server.

In one embodiment, a copy of a business application database is received and stored in the in-memory database of the in-memory database server. Data for simulation is selected from the copy of the business application database. The selected data is communicated to the business application server for simultaneous scenarios simulation using the selected data. The in-memory database server receives and temporarily stores simulation results from the simultaneous scenarios simulation from the business application server in the in-memory database server.

In one embodiment, a score for each scenario is computed based on the simulation results at the in-memory database server. The scores are then compared to select one scenario using the user-defined rules at the in-memory database server. The business application database is then updated with simulation results corresponding to the selected scenario.

In another embodiment, a selection of data is performed from the in-memory database based on input conditions. The selection of data is stored in the in-memory database. A set of process related filtering rules is applied to the selection of data in the in-memory database. The selection of data is sorted to generate a filtered dataset. An allocation is performed based on the filtered dataset to generate allocation results for each scenario in the in-memory database.

In another embodiment, the allocation results are processed for each scenario in parallel at the business application server to generate the simulation results for each scenario. The simulation results are received for all scenarios from the business application server. One scenario is identified using the user-defined rules from the simulation results. A posting is performed m the business application database using the identified scenario.

In another embodiment, the business application server is configured to process in parallel using multiples threads, each thread covering a business process using a different user variant for each scenario. The scenarios simulation may include a business processes simulation.

The solution presented in the present specification provides a design framework to rewrite existing applications by using in-memory systems, to accelerate and perform multiple scenario runs and comparisons to come up with the best solution to a problem. By using in-memory systems power capabilities of calculation and analytics on mass data, the execution time of those background jobs will be reduced significantly. This effectively reduces the latency and increases the flexibilities and accuracy for the business process in the business application.

Furthermore, "what-if scenario" functionality enables customers to run the same business process by using different scenarios (variants). In one embodiment, users may define the scenarios in advance. With this solution, different strategies and requirements can be fulfilled.

Another benefit is that once the business processes of all scenarios are completed, the temporary results are stored in the in-memory system for further calculation and analysis based on user-defined rules. The in-memory system's comparison procedures determine the "best" result according to the rules (for example, the most amount scenario, the most coverage scenario, most VIP satisfying scenario, and so forth).

After the results comparison and selection, the selected result can be directly saved back into the business application server together with all related data changes. In this case, users no longer need to run the same business process twice in order to save the result as typically done under simulation mode.

As such, multiple scenarios help the customer drive better business results and also avoid manual intervention in decision making. The decision making of "best scenario" is in-memory-systems driven and thus the performance is much faster than expected. Business rules can also be configurable, which gives the customer flexibility for decision making.

Figure 1:
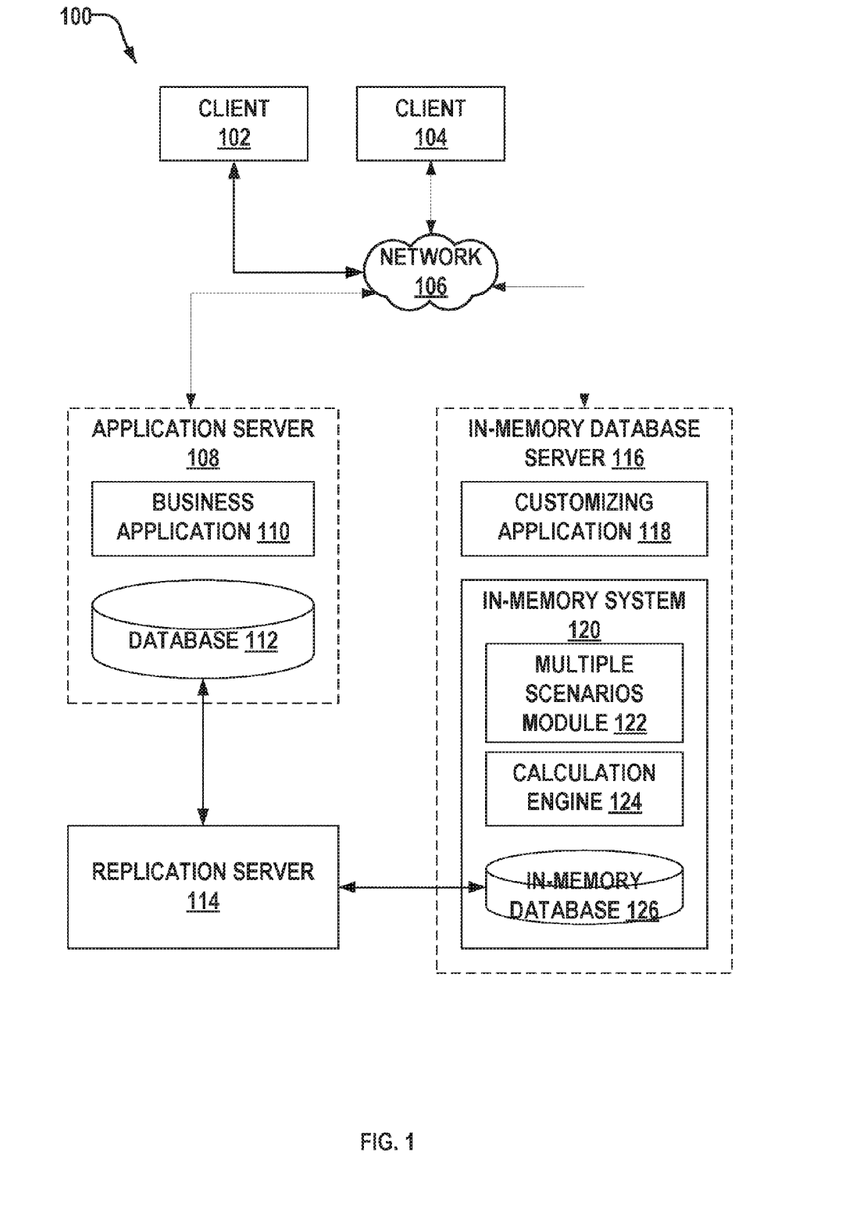
FIG. 1 is a block diagram illustrating an example of a system in which embodiments may be practiced.

With reference to FIG. 1, a system 100 in which example embodiments may be practiced is shown. The system 100 comprises clients 102 and 104 accessing an application server 108 and/or an in-memory database server 116. Clients 102 and 104 are communicatively coupled to the application server 108 and the in-memory database server 116 via a computer network 106. The computer network 106 may comprise, for example, one or more of a wired or wireless network, a local area network (LAN), or a wide area network (WAN).

In one embodiment, the application server 108 may include, for example, a business application 110 and a database 112. The in-memory database server 116 may include, for example, a customizing application 118 and an in-memory system 120. The in-memory database server 116 may include, for example, an in-memory system 120 made up of an-memory database 124. The in-memory database 124 may include a database management system that primarily relies on main memory such as RAM simfor computer data storage. It is contrasted with database management systems that employ a disk storage mechanism. One example of an in-memory database is the HANA system from SAP AG of Walldorf, Germany.

The in-memory system 120 may include, a multiple scenarios module 122, a calculation engine 124, and the in-memory database 126. A replication server 114 has access to both the database 112 of the application server 108 and the in-memory database 126 of the in-memory database server 116.

With respect to application server 108, the business application 110 may include a software application configured to compute business processes such as projecting sales, keeping track of inventory, computing sales for items based on location and time, and so forth. The business application 110 may also be capable of running, simulations of scenarios to determine an optimal outcome for as business process. The database 112 may be configured to store data related to the business application 110. Such data may include for example, sales figures, employment figures, costs, projected revenues, delay percentages, inventory stock management, sales amount, and so forth.

The replication server 114 may be configured to copy or duplicate a portion of the database 112 of the application server 108 to the in-memory database 126 of the in-memory database server 116. In another embodiment, the replication server 114 duplicates only data relevant to scenario simulation from the database 112 to the in-memory database 126. In other words, only tables that are used in the business application are replicated to the in-memory database 126. In yet another embodiment, the replication server 114 duplicates the entire data in the database 112 to the in-memory database 126.

The customizing application 118 may be configured to receive user-defined parameters related to scenario simulations. The user-defined parameters may include for example, dates constraints, sales figures constraints, location constraints, and so forth. The user-defined parameters may he used to filter relevant data from the in-memory database 126 for scenario simulation. Furthermore, the user-defined parameters may include different variations in parameters for each scenario related to a business process. For example, a user may wish to determine the outcome from to scenario based on different sets of parameters by defining the user-defined parameters.

The in-memory system 120 may be configured to operate and compute on data stored in a physical memory such as RAM. For example, the in-memory system 120 includes the multiple scenarios module 122 for selecting data from the in-memory database 126 based on the user-defined parameters set forth using the customizing application 118. The calculation engine 124 may be configured to prepare data for computation simulation at the business application 110.

Figure 2:
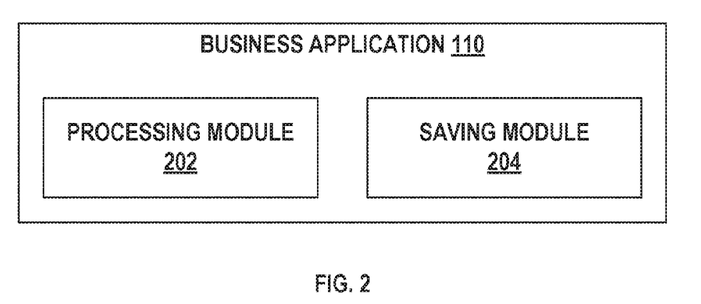
FIG. 2 is a block diagram illustrating an example embodiment of a business application.

In one embodiment, the business application 110 may be enhanced with the multiple scenarios module 122 of the in-memory system 120 by separating the code for the business application 110 within the core process into three parts: selection, processing, and saving. Any core business application process can be categorized into these three steps. FIG. 2 illustrates an example of the business application 110 including a processing module 202 and a saving module 204.

Selection: the selection process of the business application 110 may be replaced with the in-memory system store procedures (multiple scenarios module 122 and calculation engine 124).

Processing: the processing may be multiplied into separate threads running in parallel. Each thread covers the whole process by using a different user variant that is also referred to as a scenario. In one embodiment, the processing may be performed using the processing module 202 of the business application 110.

Saving: the saving process does not happen right after the processing process, but rather after the comparison and best-selection steps described further below. In one embodiment, the saving process may be performed using the saving module 204 of the business application 110.

Figure 3:
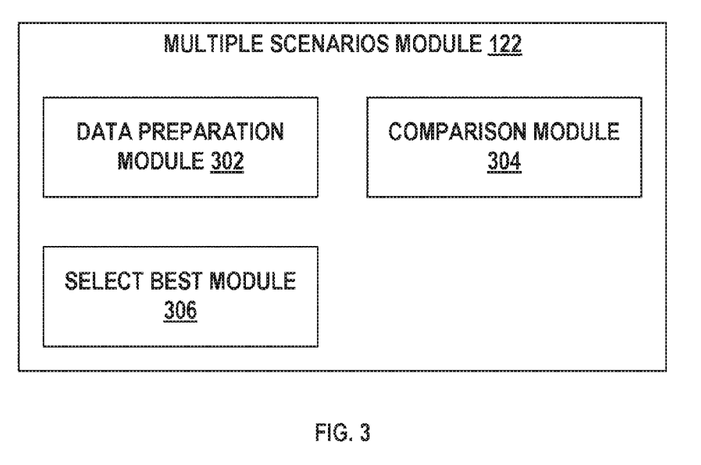
FIG. 3 is a block diagram illustrating an example embodiment of a multiple scenarios module.

The multiple scenarios module 122 enables different procedures in the in-memory system 120. In one embodiment, there are three kinds of procedures in the in-memory system 120; procedures for selection, procedures for comparison, and procedures for best-selection. FIG. 3 illustrates an example of the multiple scenarios module 122 including a data preparation module 302, a comparison module 304, and a select best module 306.

The procedures for selection may be implemented using the data preparation module 302 of the multiple scenarios module 122. No matter how complex the selection logic is, it is feasible to use in-memory systems procedures to rewrite the selection part. By doing this, the performance will be much better because queries across huge tables are very slow in the business application 110 based on its database 112.

The procedures for comparison may be implemented using the comparison module 304 of the multiple scenarios module 122. Different scenarios can produce different results. The comparison module 304 compares these different results. The in-memory system 120 then analyzes the different results according to the user's preferences provided using the customizing application 118. In particular, the in-memory system 120 has the capability to handle complex calculation within huge tables using the calculation engine 124.

The procedures for selecting the best scenario may be implemented using the select best module 306. In one embodiment, a query for the best scenario may be performed on the in-memory database 126 using the comparison results generated by the calculation engine 124. The returned data from the query may be transferred back to business application 110. In other words, the best scenario is identified in the in-memory system 120 and communicated to the business application 110 for the business application 110 to commit the results in the database 112.

While the example embodiment of FIG. 1 shows the multiple scenarios module 122 and the calculation engine 124 in one server system (e.g., in-memory database server 116), alternative embodiments may contemplate the various components of the multiple scenarios module 122 and the calculation engine 124 being embodied within several systems (e.g., cloud computing system, server farm system).

Figure 4:
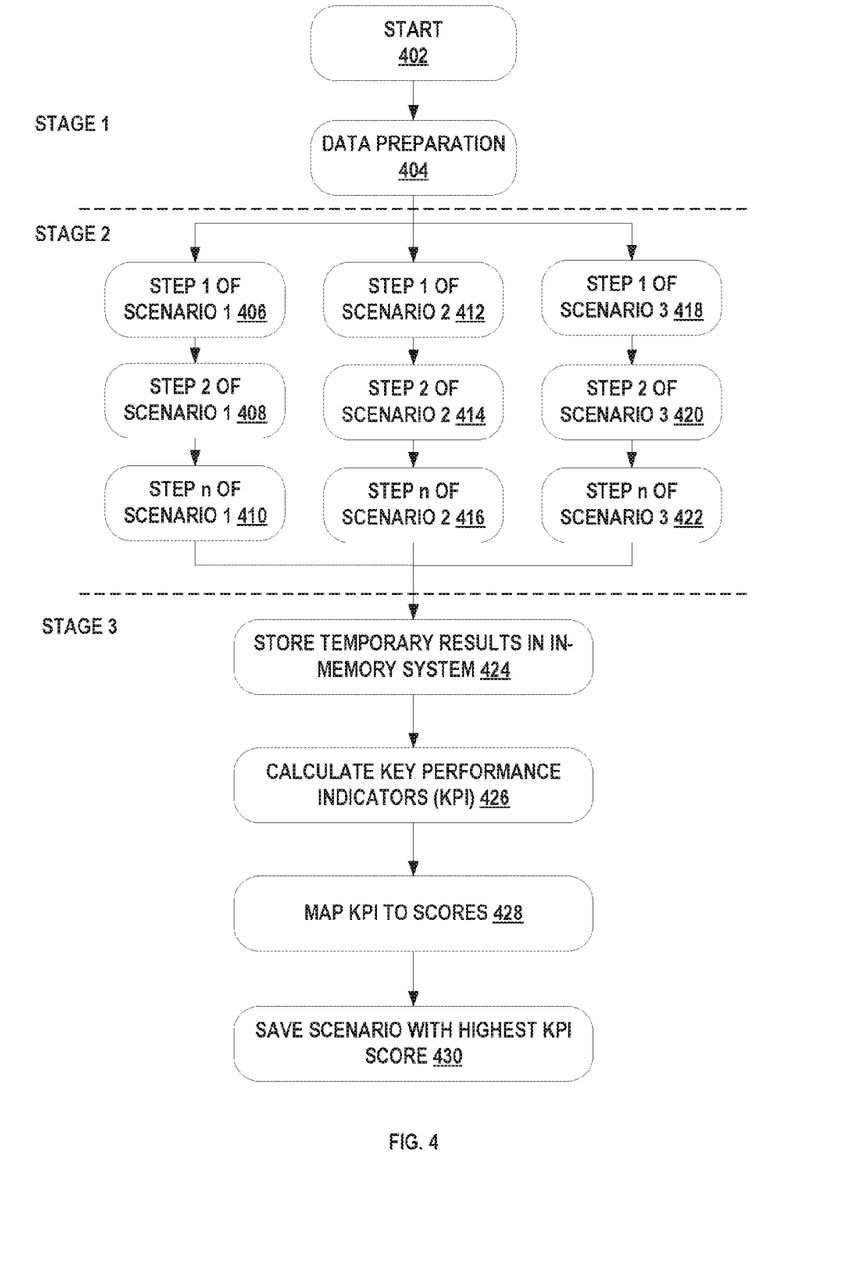
FIG. 4 is a flow diagram of an operation, in accordance with an example embodiment, running multiple simultaneous simulations using an in-memory system.

FIG. 4 is a flow diagram of a method 400, in accordance with an example embodiment, for running multiple simultaneous simulations using an in-memory system. As previously described, any existing program execution of a business application can be divided into three stages: stage 1 which is data preparation, stage 2 which is parallelization and simulation stage, and stage 3 which is comparison and result picking stage. The diagram in FIG. 4 illustrates these three stages.

The method starts at operation 402 in stage 1, where the data preparation 404 mainly takes place on the in-memory system side. As much selection and data collection business logic as possible is put in the in-memory system in this stage. All the appropriate input parameters are passed to in-memory system side for the selection. The resulting data are transferred back to the business application, which will be used for further processing.

Stage 2, the parallelization and simulation stage, mainly takes place on the business application side. Core business logics which cannot be optimized by the in-memory system are put in this stage. Instead of running the different scenarios simulation in a serialized manner, these business logics can be processed multiple times by using different customer parameters, which are also referred to as scenarios. It should be noted that these three executions (scenario 1 consisting of operations 406, 408, 410, scenario 2 consisting of operations 412, 414, 416, and scenario 3 consisting of operations 418, 420, 422) of the scenario simulations are run in parallel and independently from each other. In one embodiment, the different scenario simulations are run in parallel simultaneously. The output results may be stored into different temporary tables, also referred to as the simulation results. In one embodiment, simulation results are written back to the in-memory system via a secondary connection.

Stage 3, the comparison and result picking stage, may take place on both the in-memory system side (first half) and the business application side (second half).

Simulation results of the different scenarios may be inserted in corresponding temporary tables on the in-memory system side. For example, FIG. 4 illustrates three different scenarios. The simulation results of the different scenarios 1, 2, and 3 are inserted into three different temporary tables on the in-memory system side at operation 424. Afterwards, Key Performance Indicators (KPIs) from several dimensions of these results may be calculated by the in-memory system procedures at operation 426. For example, the procedures may calculate the delay percentage, stock coverage, sales amount, and so forth. Lastly, all the KPI may be mapped to scores, the scenario with the highest score may be saved back to the business application for final processing result at operations 428 and 430. For example, one scenario may be selected using user-defined rules, such as a scenario with the highest or lowest mapped score, the fastest scenario, the most efficient scenario, the scenario that generates the most projected revenues, and so forth.

The in-memory system selection results are passed to the business application where there may be separate tables to hold the data. The execution these data sets may be performed in parallel with different criteria applied to each one of them. The criteria may be, based on the three different configurations (for example, the configuration can be based on fulfillment rates for requirements) which may be decided by the customer during the runs. These three runs are independent from one another since the data is separate for each run.

After the business logic is applied, the three different results may be sent to the in-memory system for comparison, which will help the customer to meet the best fit for their requirements. From the in-memory system comparison, there may be an indicator sent to the business application to commit which is the best result to the database of the business application. The results from the internal tables may then be committed to the database.

The following are pseudo codes illustrating an example of the process described in the present application. The example below illustrates an allocation process of a retail solution. Currently this program runs in batch mode and most of the times are executed overnight. Currently the program may perform the following:

Performs selection of data from traditional database based on the input conditions. This step generates internal tables viz, gt_bedf, gt_best, gt_bdbs.

Apply set of process related filtering rules and sorting. This step generates a modified data set using the above mentioned dataset and creates additional tables viz, y_bedf, y_best, y_bdbs.

Perform the allocation based on the dataset generated above and generate the final result tables x_arsu, gt_bedf_s, gt_best_s and gt_bdbs_s.

Perform a posting in the retail system.

In contrast, the program would take the following flow with one embodiment of the approach described in the present application:

Perform a selection of the dataset in the in-memory system and store the results in the in-memory system. This step would result in the creation of gt_bedf, gt_bset and gt_bdbs tables on the in-memory system and would be persisted in the in-memory system.

Start in parallel the multiple scenarios based on user selection.

In each step, the following sub steps are involved:

Perform the filtering of the data on the in-memory system passing the input parameters and return back the filtered and sorted sub set of data viz. y_bedf, y_bset and y_bdbs.

Perform allocation based on these derived subsets of data resulting in new tables x_arsu_scenarioid1, gt_bedf_s_scenarioid1, gt_best_s_scenarioid1 and gt_bdbs_s_scenarioid1.

Insert these results in a table in the in-memory system. The in-memory system table may have a Primary key column, ScenarioID. Then, the results of this allocation run.

Once the results of all the parallel runs are available in the in-memory system, start the comparison procedure. This procedure would do a total over the allocated amount, i,e, generate a dollar value of the highest allocation.

Now, the scenarioID generates the highest allocation dollar amount. This scenario ID is passed to the calling program in the business application.

The business application picks the results from the tables x_arsu_scenarioidX, gt_bedf_s_scenarioidX, gt_best_s_scenarioidX and gt_bdbs_s_scenarioidX where 'X' is the scenarioID of the selected scenario.

Perform posting based on this selected dataset in the business application.

Figure 5:
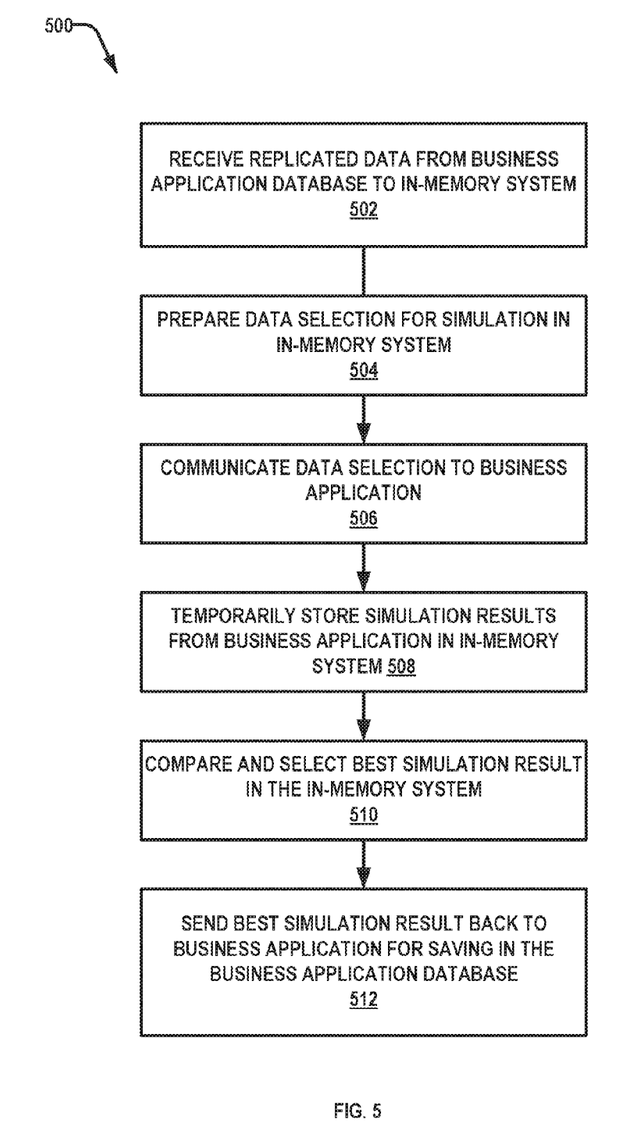
FIG. 5 is a flowchart of a method, in accordance with an example embodiment, for enabling multiple simultaneous simulations using an in-memory system.

FIG. 5 is a flowchart of a method 500, in accordance with an example embodiment, for enabling multiple simultaneous simulations using an in-memory system.

At operation 502, the in-memory database of the in-memory database server receives and stores a copy of as business application database. In one embodiment, the replication server 114 performs the replication of relevant data from the database 112 of the application server 108 and copies it to the in-memory database 126 as illustrated in FIG. 1.

At operation 504, the in-memory database server prepares data for simulation by selecting data for simulation from the copy of the business application database. In one embodiment, the data preparation module 302 of the multiple scenarios module 122 as illustrated in FIG. 3 may prepare the data for simulation.

At operation 506, the in-memory database server communicates the selected data to the business application server for simultaneous scenarios simulation using the selected data. In one embodiment, the data preparation module 302 as illustrated in FIG. 3 communicates the selected data to the processing module 202 of the business application 110 as illustrated in FIG. 2 for further processing.

At operation 508, the in-memory database server receives and temporarily stores simulation results from the simultaneous scenarios simulation by the business application server in the in-memory database server. In one embodiment, the comparison module 304 receives the simulation results from the business application.

At operation 510, the in-memory database server computes a score for each scenario based on the simulation results at the in-memory database server, and compares the scores to select one scenario using the user-defined rules at the in-memory database server. In one embodiment, the calculation engine 124 as illustrated in FIG. 1 may perform the computation of the scores and report the scores to the multiple scenarios module 122 for comparison and selection. For example, the comparison module 304 of the multiple scenarios module 122 as illustrated in FIG. 3 may compare the scores from the calculation engine 124. The select best module 306 as illustrated in FIG. 3 may identify and select the scenario with the highest or lower score.

At operation 512, the in-memory database server sends the best simulation result back to the business application for the business application to update the business application database with simulation results corresponding to the selected scenario. In one embodiment, the select best module 306 as illustrated in FIG. 3 may communicate the best scenario back to the business application 110. The saving module 204 of the business application 110 as illustrated in FIG. 2 may receive the best scenario and may update the business application database with the data corresponding to the best scenario.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 6:
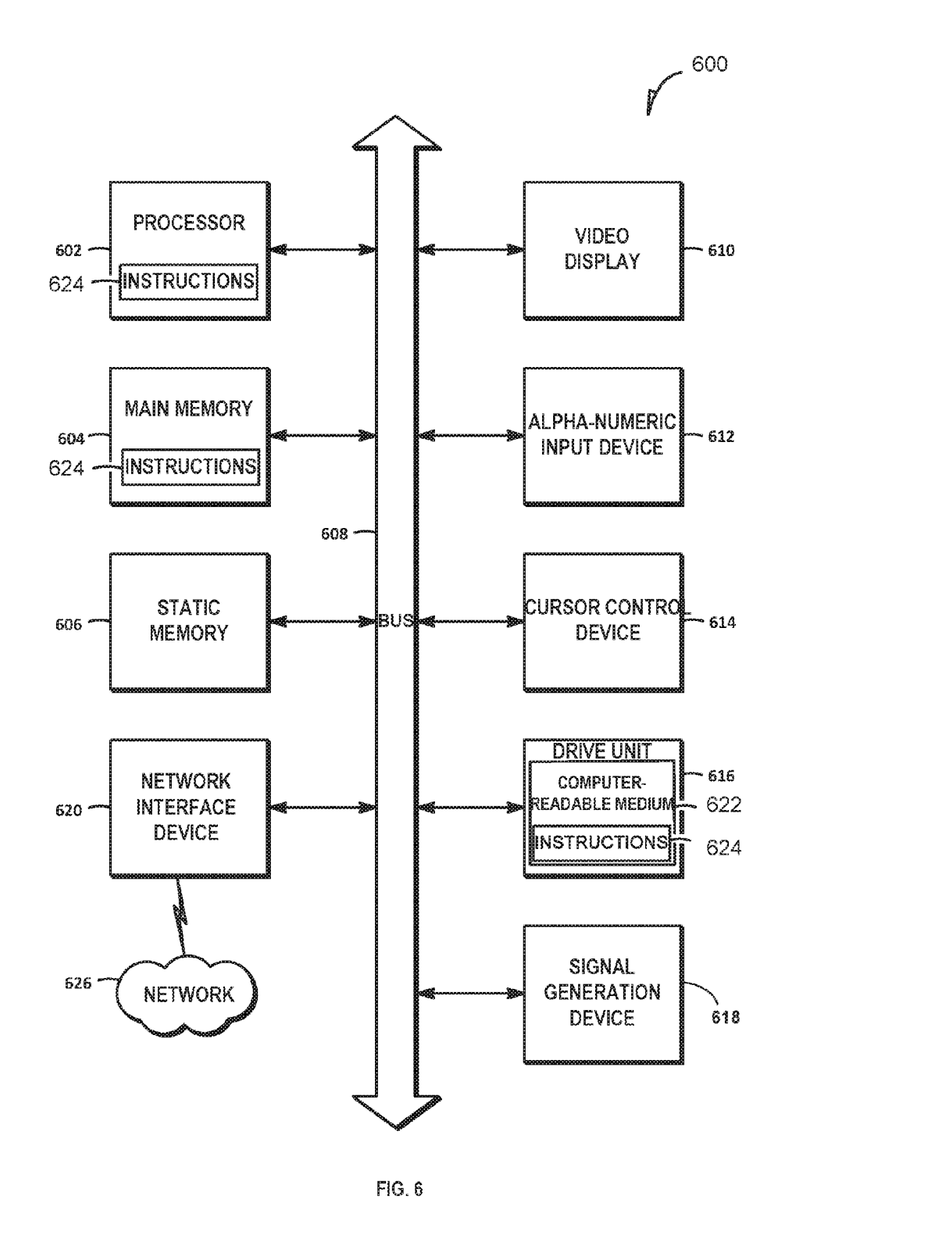
FIG. 6 is a block diagram of a machine in an example form of a computing system within which a set of instructions for causing the machine to perform any one or more of the methodologies discussed herein may be executed.

With reference to FIG. 6, an example embodiment extends to as machine in the example form of a computer system 600 within which instructions 624 for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (SIB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CNU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alphanumeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a computer-readable storage medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the computer-readable storage medium 622 is shown in an exemplary embodiment to be a single medium, the term "computer-readable storage medium" may include a single storage medium or multiple media (e.g., a centralized or distributed database, or associated, caches and servers) that store the one or more instructions 624. The term "computer-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "computer-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present disclosure.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in to context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A computer-implemented method comprising:
    selecting data for simulation from an in-memory database of an in-memory database server for simultaneous scenarios simulation at a business application server;
    receiving and temporarily storing simulation results of a plurality of scenarios received from the business application server at the in-memory database;

selecting one scenario of the plurality of scenarios based on using user defined rules at the in-memory database server; and communicating the selected scenario to the business application server.

2. The computer-implemented method of claim 1, further comprising:

receiving and storing a copy of a business application database in the in-memory database of the in-memory database server; and selecting data for simulation from the copy of the business application database.

3. The computer-implemented method of claim 2, further comprising:

communicating the selected data to the business application server be simultaneous scenarios simulation using the selected data; and receiving and temporarily storing simulation results from the simultaneous scenarios simulation by the business application server in the in-memory database server.

4. The computer-implemented method of claim 3, further comprising:

computing a score for each scenario based on the simulation results at the in-memory database server; and comparing the scores to select one scenario using the user-defined rules at the in-memory database server.

5. The computer-implemented method of claim 4, further comprising:

updating the business application database with simulation results corresponding to the selected scenario.

6. The computer-implemented method of claim 1, wherein selecting data for simulation further comprises:

performing a selection of data from the in-memory database based on input conditions;

storing the selection of data in the in-memory database;

applying a set of process related filtering rules to the selection of data in the in-memory database and sorting the selection of data to generate a filtered dataset; and performing an allocation based on the filtered dataset to generate allocation results for each scenario in the in-memory database.

7. The computer-implemented method of claim 6, further comprising;

processing the allocation results for each scenario in parallel at the business application server to generate the simulation results for each scenario;

receiving the simulation results for all scenarios from the business application server; and identifying one scenario using the user-defined rules from the simulation results.

8. The computer-implemented method of claim 7, further comprising;

performing a posting in the business application database using the identified scenario.

9. The computer-implemented method of claim 1, wherein the business application server is configured to process in parallel using multiples threads, each thread covering a business process using a different user variant for each scenario.

10. The computer-implemented method of claim 1, wherein the simultaneous scenarios simulation comprises business processes simulation.

11. A system comprising:

a memory configured to store an in-memory database; and an in-memory database server coupled to the memory, the in-memory database server configured to select data for simulation for simultaneous scenarios simulation at a business application server, to receive and temporarily store simulation results of a plurality of scenarios received from the business application server at the in-memory database, to select one scenario of the plurality of scenarios based on using user-defined rules at the in-memory database server, and to communicate the selected scenario to the business application server.

12. The system of claim 11, wherein the in-memory database server is further configured to receive and store a copy of a business application database in the in-memory database of the in-memory database server, and to select data for simulation from the copy of the business application database.

13. The system of claim 12, wherein the in-memory database server is further configured to communicate the selected data to the business application server for simultaneous scenarios simulation using the selected data, to receive and temporarily store simulation results from the simultaneous scenarios simulation by the business application server in the in-memory database server.

14. The system of claim 13, wherein the in-memory database server is further configured to compute a score for each scenario based on the simulation results at the in-memory database server; and to compare the scores to select one scenario using the user-defined rules at the in-memory database server.

15. The system of claim 14, wherein the in-memory database server is further configured to update the business application database with simulation results corresponding to the selected scenario.

16. The system of claim 11, wherein the in-memory database server is further configured to perform a selection of data from the in-memory database based on input conditions, to store the selection of data in the in-memory database, to apply a set of process related filtering rules to the selection of data in the in-memory database and sort the selection of data to generate a filtered dataset, and to perform an allocation based on the filtered dataset to generate allocation results for each scenario in the in-memory database.

17. The system of claim 16, wherein the in-memory database server is further configured to process the allocation results for each scenario in parallel at the business application server to generate the simulation results for each scenario, to receive the simulation results for all scenarios from the business application server, and to identify one scenario using the user-defined rules from the simulation results.

18. The system of claim 17, wherein the in-memory database server is further configured to perform a posting in the business application database using the identified scenario.

19. The system of claim 11, wherein the business application server is configured to process in parallel using multiples threads, each thread covering a business process using a different user variant for each scenario, and wherein the simultaneous scenarios simulation comprises business processes simulation.

20. A non-transitory machine-readable storage medium storing instructions which, when executed by at least one processor, performs operations comprising:

selecting data for simulation from an in-memory database of an in-memory database server for simultaneous scenarios simulation at a business application server;

receiving and temporarily storing simulation results of a plurality of scenarios received from the business application server at the in-memory database;

selecting one scenario of the plurality of scenarios based on using user-defined rules at the in-memory database server; and communicating the selected scenario to the business application server.

* * * * *